(12) United States Patent
Kaczeus, Sr. et al.

(10) Patent No.: US 6,873,524 B2
(45) Date of Patent: Mar. 29, 2005

(54) DATA STORAGE DEVICE

(75) Inventors: Steven L. Kaczeus, Sr., San Jose, CA (US); Steven L. Kaczeus, Jr., Hollister, CA (US); Timothy Kim, San Jose, CA (US)

(73) Assignee: Audavi Corporation, Milpitas, CA (US)

( * ) Notice: Subject to any disclaimer, the term of this patent is extended or adjusted under 35 U.S.C. 154(b) by 51 days.

(21) Appl. No.: 10/222,687

(22) Filed: Aug. 15, 2002

(65) Prior Publication Data

US 2004/0032711 A1 Feb. 19, 2004

(51) Int. Cl.[7] .................................................. G06F 1/16
(52) U.S. Cl. ....................... 361/685; 361/684; 361/686; 360/97.02
(58) Field of Search ................................ 361/683, 685, 361/740–742, 752, 756, 758, 804; 369/215, 244, 247, 263, 75.1, 80, 81, 176, 82; 360/97.01, 97.02, 77.01, 77.05–77.09, 78.18, 97.03; 312/332.1, 333; 428/71, 76, 220, 354, 226; 267/140.3, 158, 175, 177; 248/634–636, 618, 638, 500, 609, 625; 116/201, 203

(56) References Cited

U.S. PATENT DOCUMENTS

| | | | | |
|---|---|---|---|---|
| 3,384,221 A | | 5/1968 | Houtman ...................... 206/46 |
| 4,831,476 A | * | 5/1989 | Branc et al. ............. 360/97.02 |
| 5,045,960 A | * | 9/1991 | Eding ....................... 360/97.01 |
| 5,402,308 A | * | 3/1995 | Koyanagi et al. ........... 361/685 |
| 5,510,954 A | | 4/1996 | Wyler ......................... 361/687 |
| 5,837,934 A | | 11/1998 | Valavanis et al. .......... 174/52.1 |

(Continued)

OTHER PUBLICATIONS

Title: "Protecting a Data Storage Device", Inventor: Kaczeus, Sr. et al., Jun. 10, 2003.
Mesa, "CFADPT Compact Flash Adapter", 2 pages, downloaded from http://www.mesanet.com/cfadptds.pdf; downloaded on Jul. 25, 2002.
Sorbothane® Brochure, 8 pages, downloaded from http://www.sorbothane.com/brochure_beta.html, downloaded on Aug. 15, 2002.
Sorbothane® Material Properties, 3 pages, Revised Oct. 23, 2001.
Sorbothane® Frequently Asked Questions (FAQ), 3 pages, Revised Oct. 23, 2001.
The Shockwatch "Clip" brochure, 1 page, no date.
"Using CF/PCMICIA cards on the IDE interface", 3 pages, downloaded from http://www.wau.nl/hememltje/temporary/personal/miscelaneious/cfadapter.html, downloaded Jul. 25, 2002.

*Primary Examiner*—Michael Datskovsky
(74) *Attorney, Agent, or Firm*—Silicon Valley Patent Group LLP

(57) ABSTRACT

A data storage device includes a housing in which is mounted a data storage unit, such as a hard disk drive. Pads serve as shock mounts at the corners of the data storage unit and separate the data storage unit and the housing. A flex circuit electrically couples the data storage unit and a connector at the front of the device. The flex circuit has, e.g., an "N" shape configuration, which advantageously provides flexibility in many directions. The data storage device may convert the number of pin connections from the data storage unit to a different number of pin connections. A docking module that receives the portable data storage device may also convert the number of pin connections from the data storage device to a different number of pin connections used by a host system. The docking module includes a slide for receiving and ejecting the portable data storage device.

15 Claims, 12 Drawing Sheets

U.S. PATENT DOCUMENTS

| | | | | |
|---|---|---|---|---|
| 5,886,869 A | * | 3/1999 | Fussell et al. | 361/685 |
| 5,947,572 A | * | 9/1999 | Chang | 312/332.1 |
| 5,995,365 A | | 11/1999 | Broder et al. | 361/685 |
| 5,999,406 A | * | 12/1999 | McKain et al. | 361/704 |
| 6,108,163 A | * | 8/2000 | Boutaghou | 360/97.02 |
| 6,154,360 A | | 11/2000 | Kaczeus, Sr. et al. | 361/685 |
| 6,249,432 B1 | | 6/2001 | Gamble et al. | 361/685 |
| 6,304,440 B1 | * | 10/2001 | Lin | 361/685 |
| 6,351,374 B1 | * | 2/2002 | Sherry | 361/685 |
| 6,442,022 B1 | * | 8/2002 | Paul | 361/685 |
| 6,496,362 B2 | * | 12/2002 | Osterhout et al. | 361/685 |
| 6,501,644 B1 | * | 12/2002 | Silverman et al. | 361/685 |
| 6,560,099 B1 | * | 5/2003 | Chang | 361/685 |

* cited by examiner

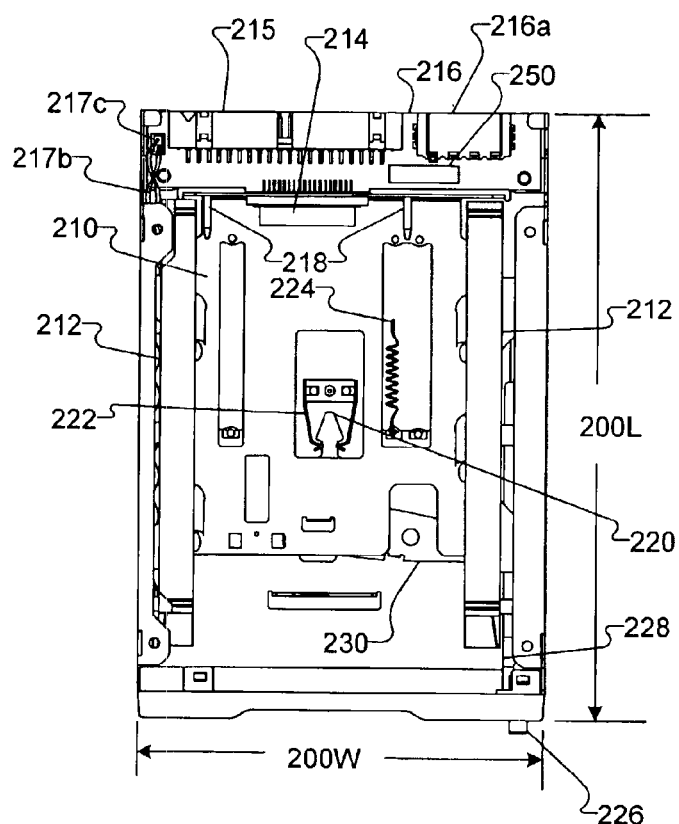
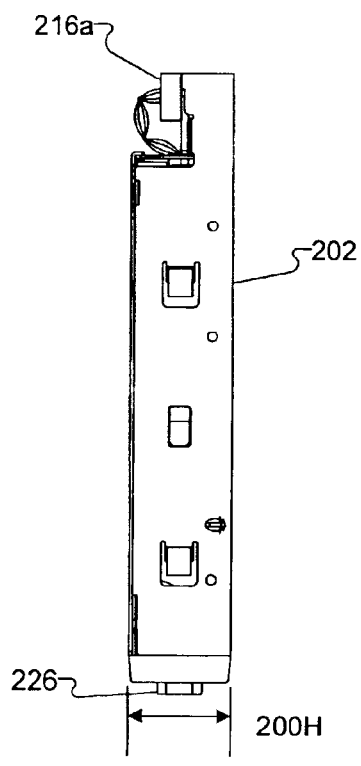
Fig. 10A
Fig. 10B
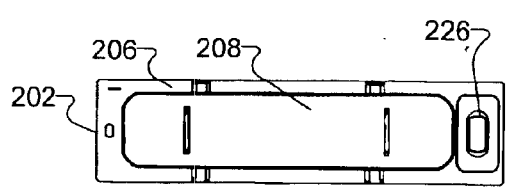
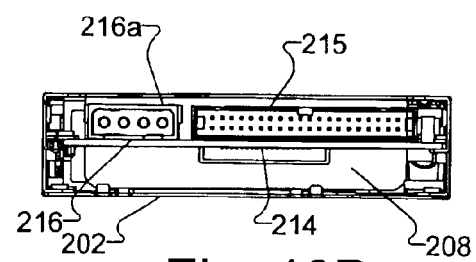
Fig. 10C
Fig. 10D

| IED-44 (142) | Signal | MC-36 (152) |
|---|---|---|
| 1. | RESET | 1 |
| 2. | GND | |
| 3. | D7 | 2 |
| 4. | D8 | 20 |
| 5. | D6 | 3 |
| 6. | D9 | 21 |
| 7. | D5 | 4 |
| 8. | D10 | 22 |
| 9. | D4 | 5 |
| 10. | D11 | 23 |
| 11. | D3 | 6 |
| 12. | D12 | 24 |
| 13. | D2 | 7 |
| 14. | D13 | 25 |
| 15. | D1 | 8 |
| 16. | D14 | 26 |
| 17. | D0 | 9 |
| 18. | D15 | 27 |
| 19. | GND | |
| 20. | KEY LOCK | |
| 21. | DMARQ | 36 |
| 22. | GND | |
| 23. | WR | 11 |
| 24. | GND | |
| 25. | RD | 12 |
| 26. | GND | |
| 27. | IORDY | 32 |
| 28. | CSEL | |
| 29. | DMACK | 14 |
| 30. | GND | |
| 31. | IRQ | 15 |
| 32. | IOCS16 | |
| 33. | DA1 | 16 |
| 34. | PDIAG | 31 |
| 35. | DA0 | 17 |
| 36. | DA2 | 34 |
| 37. | CS0 | 18 |
| 38. | CS1 | 35 |
| 39. | DASP | 30 |
| 40. | GND | |
| 41. | +5V | 10,33 |
| 42. | +5v | 10,33 |
| 43. | GND | |
| 44. | UNUSED | |
| | GND | 13, 19, 28, 29 |

FIG. 12

| IED-40 (host) | Signal | MC-36 (214) |
|---|---|---|
| 1. | RESET | 1 |
| 2. | GND | |
| 3. | D7 | 2 |
| 4. | D8 | 20 |
| 5. | D6 | 3 |
| 6. | D9 | 21 |
| 7. | D5 | 4 |
| 8. | D10 | 22 |
| 9. | D4 | 5 |
| 10. | D11 | 23 |
| 11. | D3 | 6 |
| 12. | D12 | 24 |
| 13. | D2 | 7 |
| 14. | D13 | 25 |
| 15. | D1 | 8 |
| 16. | D14 | 26 |
| 17. | D0 | 9 |
| 18. | D15 | 27 |
| 19. | GND | |
| 20. | KEY LOCK | |
| 21. | DMARQ | 36 |
| 22. | GND | |
| 23. | WR | 11 |
| 24. | GND | |
| 25. | RD | 12 |
| 26. | GND | |
| 27. | IORDY | 32 |
| 28. | CSEL | |
| 29. | DMACK | 14 |
| 30. | GND | |
| 31. | IRQ | 15 |
| 32. | IOCS16 | |
| 33. | DA1 | 16 |
| 34. | PDIAG | 31 |
| 35. | DA0 | 17 |
| 36. | DA2 | 34 |
| 37. | CS0 | 18 |
| 38. | CS1 | 35 |
| 39. | DASP | 30 |
| 40. | GND | |
| | GND | 13, 19, 28, 29 |
| | Power (+5V) | 10, 33 |

FIG. 14

DATA STORAGE DEVICE

BACKGROUND OF THE INVENTION

1. Field of the Invention

The present invention relates to a portable data storage device and, in particular, to a high impact resistant data storage device.

2. Discussion of the Related Art

Conventional hard disk drives, such as those used with personal computers and other types of processors, suffer from an inherent fragility and Electrostatic Discharge sensitivity. Consequently, hard disk drives are conventionally fixed within the computer housing, which makes it difficult to access the disk drives, transfer large data files, or to update and replace the disk drives in case of a failure. Because hard disk drives are fixed units within a computer, and the operating systems (OS) is resident on the hard disk drives, the OS and application software are also non-transferable elements of computer systems. Thus, the fragility of conventional hard disk drives influence today's computer architecture, making it non-flexible, non-interchangeable, and expensive.

In nearly all current designs for disk drives, shock resistance is a major design consideration. Despite such efforts, shocks imparted to a drive as the result of being dropped, hit, jiggled, or by other movement are known to cause serious damage to the drive. Many design efforts have been attempted to reduce problems with shock, and substantial strides have been made compared to the extremely fragile designs of a few years ago. Nevertheless, disk drives are still generally fragile.

Several approaches have been attempted to make a portable data storage device. One approach is a removable media drive, such as that produced by Iomega and SyQuest. These systems attempted to solve shock problems in a portable environment by simply arranging for the removal of the media during power-off. In these designs, a fixed head stack remains in a housing, while the media cartridge is removed. While this configuration allows for shock resistance, the lack of a sealed environment has created serious limitations.

Another approach to a portable data storage device is described in U.S. Pat. No. 6,154,360. In this approach, a disk drive is basically encased in a padding material and mounted within a protective housing. While this approach provides a large shock resistance, other problems result, such as vibration, heat dissipation, large physical dimensions and EMI (electromagnetic Interference) shielding.

Thus, what is needed is an improved data storage device that is impact and vibration resistant, while being ergonomically sized and portable.

SUMMARY

A portable data storage device, in accordance with an embodiment of the present invention, is configured to withstand shock and vibrations, while providing substantial heat dissipation characteristics and EMI shielding.

In accordance with one embodiment, the device includes a housing, which may be manufactured from a metal material, and a data storage device, such as a hard disk drive, mounted inside the housing. A plurality of pads is mounted to the data storage device approximately at each corner. The pads are disposed between the housing and the data storage device. The pads serve as shock mounts to protect the data storage device from both shock and vibration. Inside the housing, a mounting bracket defines a main chamber in which the data storage device is mounted. At least two pads are disposed between the data storage device and the mounting bracket. The pads may be manufactured from a polyurethane material, and more specifically a polyether-based polyurethane material, which may also be a thermoset material. A portion of the pads may have a conical shape, which assists in their shock performance. In one embodiment, the pads have a hollow conical shape.

In another embodiment of the present invention, the device includes a housing with a data storage device mounted inside the housing. A flex circuit couples the data storage device inside the housing to a connector that is at the front of the housing, e.g., through a printed circuit board. The flex circuit is configured to permit motion in many different directions. For example, the flex circuit may be configured to have an "N" shape between the data storage device and the connector. Alternatively, the flex circuit may be configured to have an "M" shape. Thus, the flex circuit, which includes a flexible substrate between connectors at either end of the flexible substrate, is bent such that at least a portion of the flexible substrate is disposed between the data storage device and the connector at the front of the housing.

In another embodiment, the portable data storage device is configured to easily communicate through standard interface devices, such as parallel port, PC Card, Universal Serial Bus, and FireWire cables. In order to do this, the portable data storage device includes a circuit that converts the pin connections at the disk drive to a different number of pin connections at a connector at the front of the housing. Thus, for example, the portable data storage device includes a circuit that converts 44 pin connections of a hard disk drive to 36 pin connections. In one embodiment, the IOCS16 and CSEL signals from the data storage device are not communicated through the connector.

In yet another embodiment, a docking module is used with the portable data storage device. The docking module, e.g., includes a chassis and a sleigh that is slidably coupled to the chassis. The sleigh receives the portable data storage device when inserted into the docking module and slides the portable data storage device into the chassis. A connector within the docking module is located such that the sleigh slides the portable data storage device into contact with said second connector. The docking module may also include a circuit to convert the signals provided by the portable data storage device on a first number of pins into signals provided on a second number of pins.

In addition, in one embodiment, a docking module includes a security circuit, such as a Flash memory, EEPROM, or other appropriate memory devices that stores a security code. When a portable data storage device is inserted into the docking module, the security code in the security circuit is checked against a security code stored in the data storage device. If the codes match, the host system may access the portable data storage device through the docking module. If, however, the codes do not match, the portable data storage device may not be accessed through the docking module.

BRIEF DESCRIPTION OF THE DRAWINGS

FIGS. 10A, 10B, 10C, and 10D shows top plan, side, front and back views of the docking module.

FIG. 12 is a table showing the pin numbers of the 44 pin AT/IDE connector of the disk drive and the 36 pin mating connector and the signals that are carried on each pin.

FIG. 14 is a table showing the pin numbers of the 40 pin AT/IDE connector of the host interface and the 36 pin mating connector and the signals that are carried on each pin.

DETAILED DESCRIPTION

Figure 1:
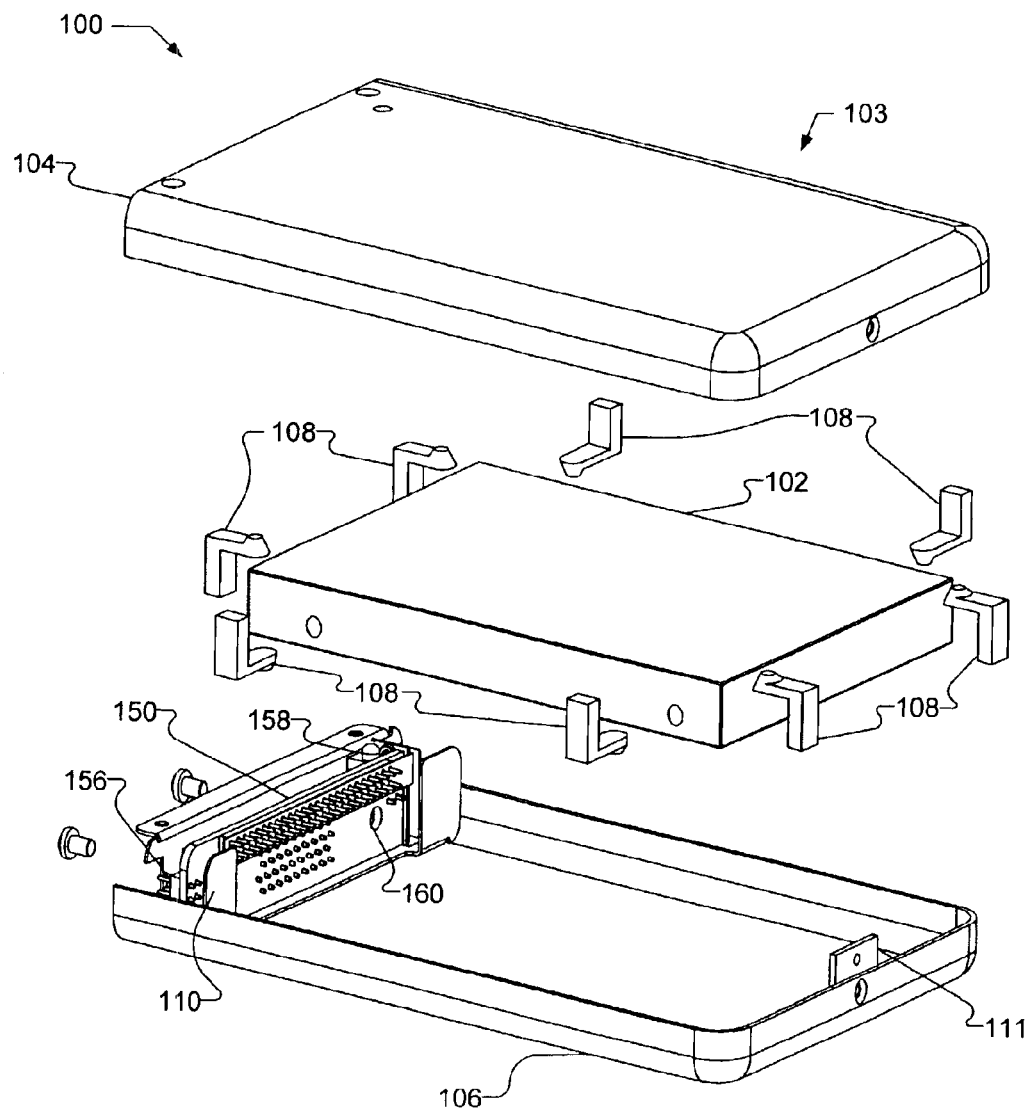
FIG. 1 shows an exploded perspective view of a high impact resistant data storage device, in accordance with an embodiment of the present invention.
Figure 2A:
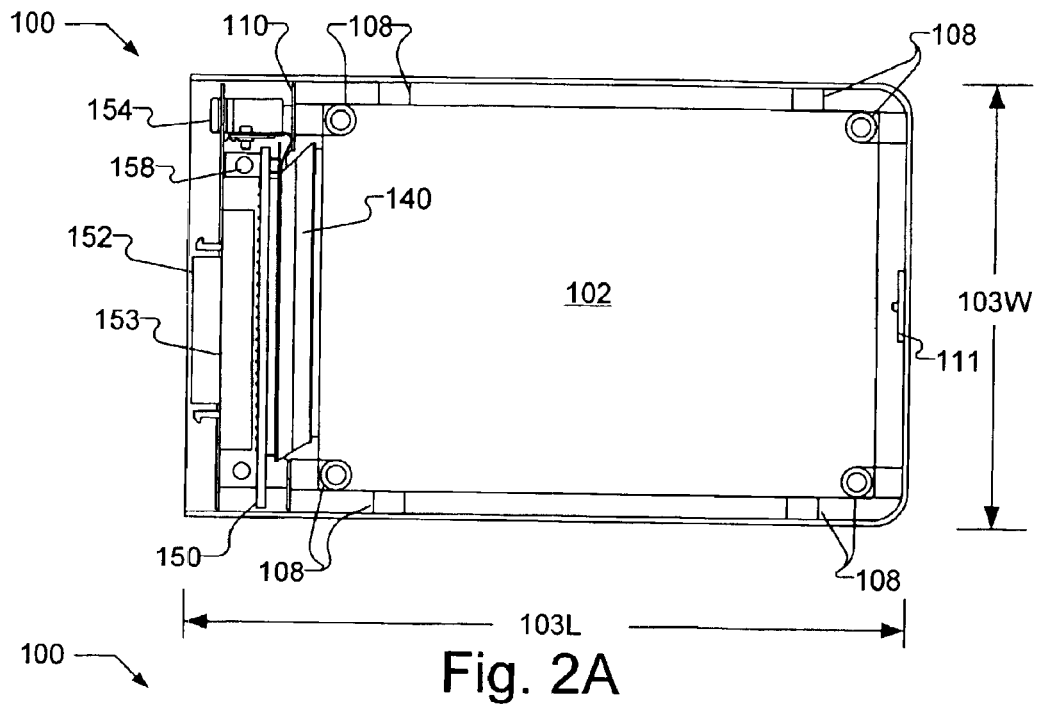
FIGS. 2A, 2B, and 2C show top plan, side and front views of the data storage device, respectively.
Figure 2B:
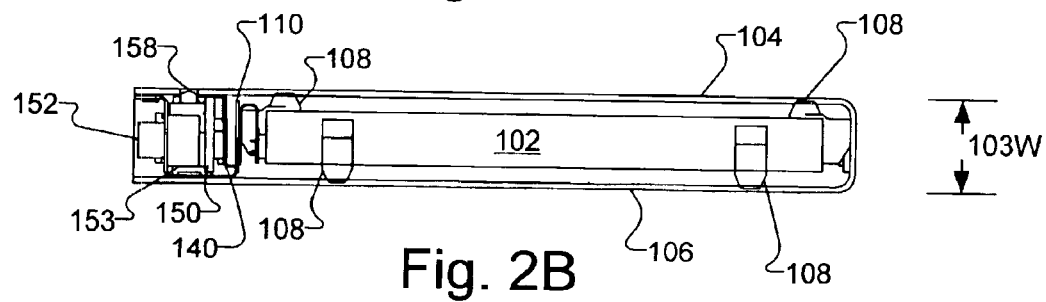
Figure 2C:
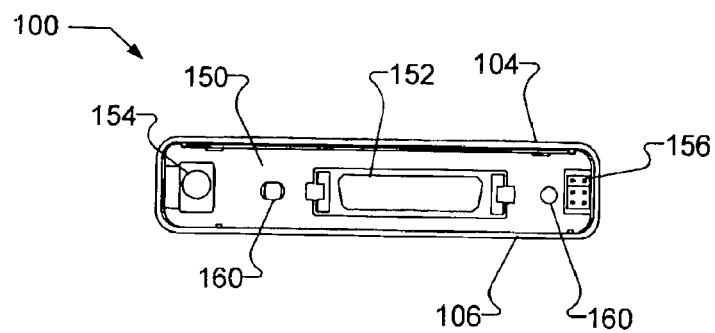

FIG. 1 shows an exploded perspective view of a high impact resistant data storage device 100 in accordance with the present invention. FIGS. 2A, 2B, and 2C show top plan, side and front views of the data storage device 100, respectively. Data storage device 100 includes a data storage device 102 (sometimes referred to herein as disk drive 102) that is contained within a housing 103. The housing 103 includes a lid 104 and base 106. It is desirable for the data storage device 100 to be removable and conveniently portable. Thus, in one embodiment, the housing 103 has an ergonomic, e.g., pocket size, form factor. For example, the housing 103 has a length 103L of 130 mm, a width 103W of 80 mm, and a height of 17.0 mm. The lid 104 and base 106 may be manufactured from sheet metal, such as aluminum, steel or other appropriate material, which also advantageously improves the heat transfer relative to conventional devices, as well as provides EMI shielding. The lid 104 and base 106 are coupled together, e.g., using connector bracket 110 (sometimes referred to as a mounting bracket) near the front of the housing and a rear connector bracket 111.

Pads 108 serve as shock mounts and are used to support and protect the disk drive 102 within housing 103. The disk drive 102 may be any form of data storage device requiring significant protection from shock, rough handling or other physical abuse, but for exemplary purposes will be assumed to be a conventional 2.5 inch form factor disk drive such as those available from a variety of manufacturers including Toshiba, IBM and others. By way of example, a 2.5 inch form factor disk drive from IBM having model number IBM IC25N040ATCS04-0 may be used. The disk drive 102 or other data storage device may be of any acceptable form factor, in which case the housing 103 and/or shock pads 108 will be resized to accommodate the selected data storage device.

A plurality of pads 108 supports and protects the disk drive 104 within housing 103. Pads 108 are located at approximately the corners of the disk drive 102 leaving the side portions of the disk drive 102 uncovered. The configuration of pads 108 advantageously minimizes the coverage of the surface area of the disk drive 102, which improves vibration absorption characteristics. Moreover, by minimizing the coverage of the data storage device 100, heat transfer is improved. As can be seen, four pads 108 are mounted between disk drive 102 and the base 106 and sides of housing 103. Another four of the pads 108 are mounted between disk drive 102 and the lid 104, and two of these pads are mounted between the disk drive 102 and the end of housing 103 while the other two are mounted between the disk drive 102 and a connector bracket 110 in the data storage device 100. In general, the pads 108 should be located at contact points on the disk drive 102 and preferably located near the corners.

The pads 108 are manufactured from a material that has good shock and vibration properties, which are generally inconsistent characteristics. In other words, a material that provides good shock absorption generally provides poor vibration damping qualities (e.g., foam materials) and materials that provide good vibration damping qualities provide poor shock absorption (e.g., rubber). It has been found that a polyurethane material, and more specifically a polyether-based polyurethane material, provides adequate shock resistance as well as vibration damping. It is desirable for the material to be a thermoset polyurethane material as well. For example, pads 108 may be manufactured from Sorbothane®, produced by Sorbothane, Inc. located in Kent, Ohio. A Sorbothane® with a soft durometer, e.g., 30–50 Shore A is useful.

Figure 3A:
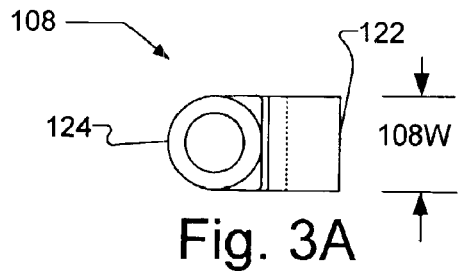
FIGS. 3A, 3B, 3C, and 3D show a top, side front, and perspective views, respectively, of a pad that serves as a shock mount in accordance with an embodiment of the present invention.
Figure 3D:
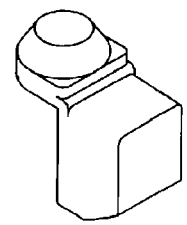
Figure 3B:
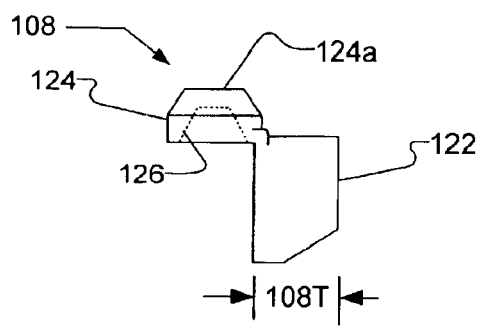
Figure 3C:
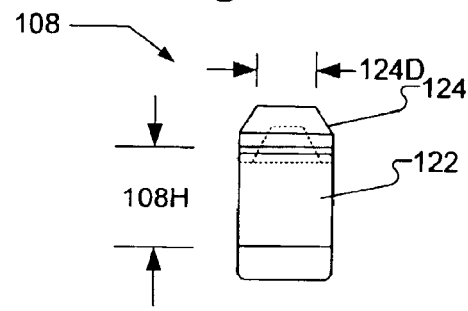

FIGS. 3A, 3B, 3C, and 3D show a top, side front, and perspective views of a pad 108, respectively. When assembled in the data storage device 100, pad 108 has a basic "L" shape, with a portion of the pad 108 on the side of the disk drive 102, referred to herein as the side portion 122 of the pad 108 and a portion on the top (or bottom) of the disk drive 102, referred to herein as the top portion 124. As can be seen in FIGS. 3A, 3B, and 3C, the pad 108 may include a beveled portion 123, which assists in assembly into the housing 103. The area of the side portion 122 of pad 108 that contacts the housing 103 generally has a height 108H of 4.35 mm, and a width 108W of 5.60 mm.

The pad 108 should have a surface area sufficient to hold the disk drive in position to perform its normal operating function. The geometry of the pad is tested to ensure that the amount of compression is sufficient to provide enough sway space for a particular shock input, e.g., 5000 G's. The top portion 124 of pad has a taper which increases the amount of compression. Moreover, the top portion 124 has a conical shape with a top surface 124a that has a diameter 124D of 3.50 mm. The use of a conical top portion 122 has been found to be particularly advantageous for its shock absorbing qualities. In addition, to provide additional compression, the conical top portion 122 of the pad 108 may include a hollowed center 126 as shown in FIGS. 3A, 3B, and 3C. The hollow center of the conical top portion 122 decreases the durometer of the pad 108. The use of pads 108 advantageously provide a non-operational shock rating of 5000 G, which provides adequate protection to the disk drive 102 while permitting a compact, ergonomic size making the device easily portable.

To improve the vibration damping characteristics it is important to properly select the material durometer, the damping characteristic of the material, and the material memory. For example, if the material durometer is too hard or too soft can excite system frequencies or have no effect at all. High damping characteristic of the material is desirable to attenuate the response so energy is not returned to the system. By way of example, Sorbothane® converts part of the energy it receives into heat and thus does not return that energy back to the system. Material memory provides for a quick return to original material position, which is desirable after a shock or during a vibration event. In addition, a wide temperature range stability is desirable. One of ordinary skill in the art may particularly tailor these factors for an individual system based on the physical dimensions, mass, heat generation, as well as desired performance of the system.

The non-operational shock rating may be increased, e.g., by encasing the disk drive 102 in impact absorbing material, as described in U.S. Pat. No. 6,154,360. However, encasing the disk drive 102 in shock absorbing material generally increases the vibration transfer to the disk drive 102 and reduces the heat transfer.

Figure 4:
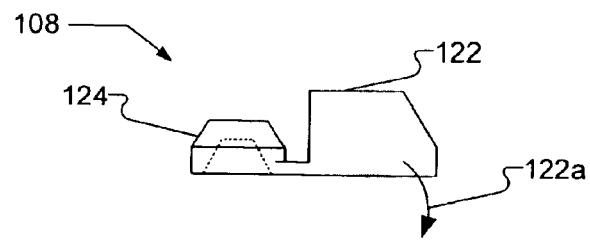
FIG. 4 shows an example of a pad formed in a plane.

Because pads 108 are made from a flexible material, e.g., Sorbothane®, the pad may be conveniently manufactured in a plane, e.g., in a sheet of the desired material, and later bent into the desired "L" shape. FIG. 4 shows an example of pad 108 in a plane. During assembly, the side portion 122 may be bent into the desired position, as indicated by arrow 122a.

Figure 5:
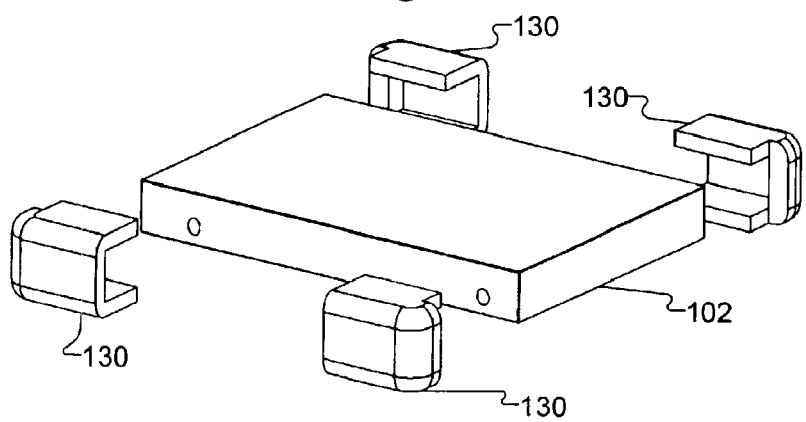
FIG. 5 shows an exploded perspective view of disk drive with pads located at the corners of the disk drive.

If desired, alternative pads that are mounted at the corners of disk drive 102 may be used in place pads 108. FIG. 5, for example, shows an exploded perspective view of disk drive 102 with pads 130 located at the corners of disk drive 102. Similar to pads 108, pads 130 advantageously minimize the surface contact with the disk drive 102.

Referring back to FIGS. 1, 2A, 2B, and 2C, a flex circuit 140 provides power and signal communication between a printed circuit board 150 and the disk drive 102. The printed circuit board 150 has fixedly connected thereto a connector 152 and housing 153 for connection to a host system and a power connector 154 for supplying power to the drive. The connector 152 is used to connect to a host system, through an appropriate connection system, such as a docking module, which will be discussed in more detail below, or a cable connection. It should be understood that the data storage device 100 may receive power through the connector 152 or through a separate power source at power connector 154. In addition, master/slave pinouts 156 may also be provided. An activity light 158, such as an LED, may also be provided on the printed circuit board 150, to indicate activity by the disk drive 102. As can be seen in FIG. 2C, alignment holes 160 are also provided through the connector bracket 110, which forms the front of the data storage device 100, and into the printed circuit board 150. The alignment holes 160 may be used to properly position the data storage device 100 when inserting the device into a docking module.

Figure 6A:
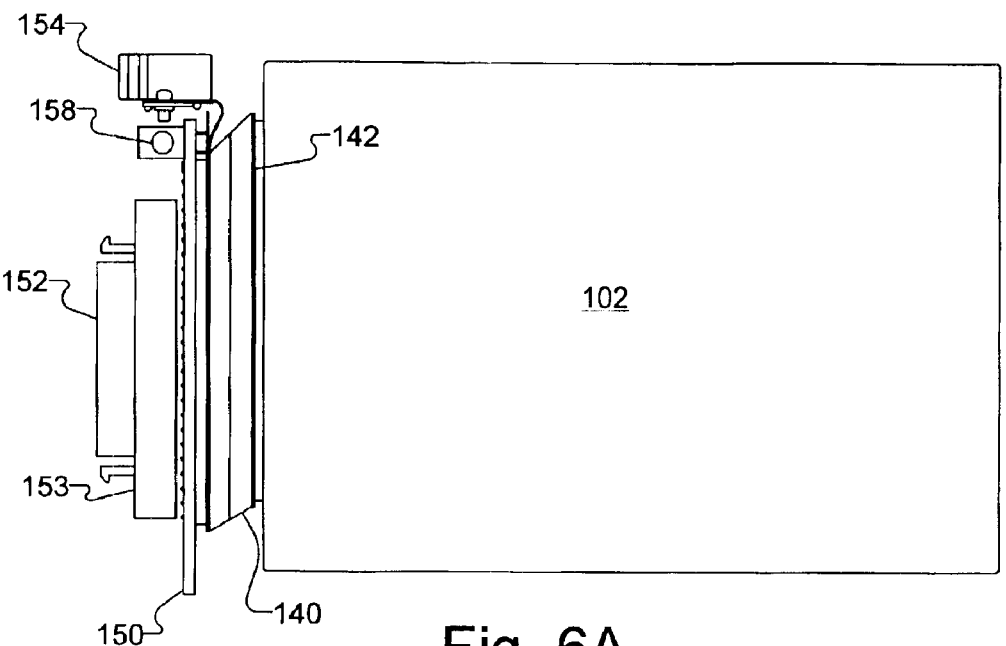
FIGS. 6A and 6B show top plan and side views, respectively, of the disk drive, a flex circuit and printed circuit board arrangement with the flex circuit having an "N" shape configuration, in accordance with an embodiment of the present invention.
Figure 6B:
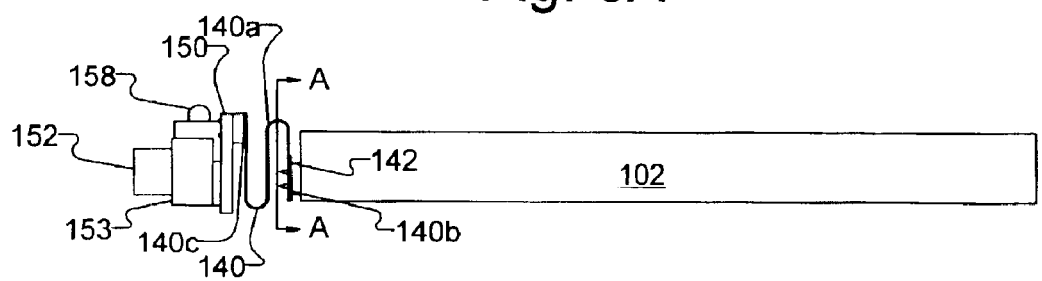
Figure 6C:
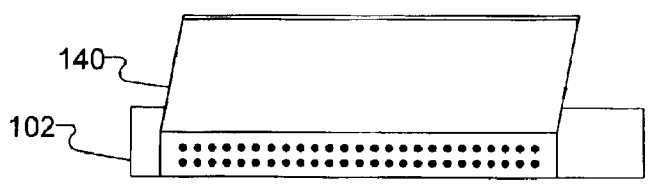
FIG. 6C shows a view of the connection of the flex circuit to the disk drive taken along lines A—A in FIG. 6B.
Figure 6D:
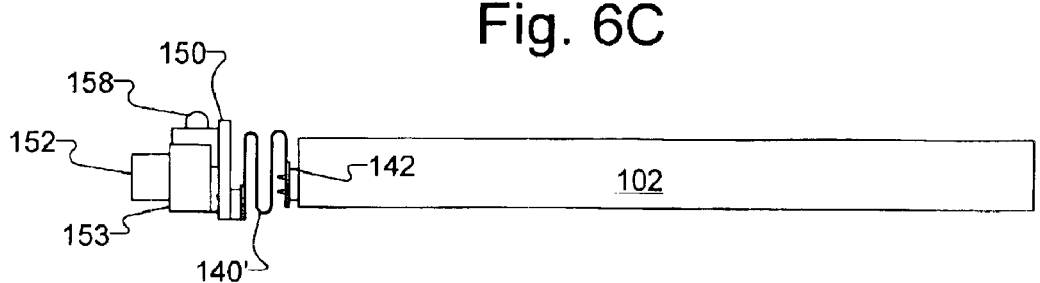
FIG. 6D shows a side view with the flex circuit having an "M" shape configuration, in accordance with another embodiment of the present invention.

FIGS. 6A and 6B show top plan and side views of the disk drive 102, flex circuit 140, printed circuit board 150 arrangement. FIG. 6C shows a view of the connection of flex circuit 140 to disk drive 102 taken along lines A—A in FIG. 6B. The flex circuit 140 is coupled to a conventional high density AT/IDE connector 142 of the disk drive 102. The flex circuit 140 is also coupled to the printed circuit board 150. As illustrated in FIG. 6B, flex circuit 140 includes a flexible substrate 140a and has connectors 140b and 140c at the ends of the flexible substrate. The flex circuit 140 is bent such that at least a portion of the flexible substrate 140a is disposed between the disk drive 102 and the printed circuit board 150. For example, as shown in FIG. 6, the flex circuit 140 has an "N" shape configuration. In another embodiment, a flex circuit 140' may have an "M" shape configuration, as shown in FIG. 6D, which shows a side view, similar to that shown in FIG. 6B.

Moreover, the length of the flex circuit 140 is at least twice the length between the disk drive and the printed circuit board. For example, the distance between the AT/IDE connector 142 and printed circuit board 150 is approximately, 7 mm, and the length of the flex circuit 140 is approximately 40 mm. The length and configuration, e.g., the "N" or "M" shape configuration, of the flex circuit 140 provide additional flexibility to the interconnection between the disk drive 102 and the printed circuit board 150. It is desirable to maintain a low bias force on the flex circuit. The flex circuit 140 should be as thin as possible to allow flexing in all directions with little resistance. By way of example, the flex circuit is 0.07 mm thick and is comprised of two layers of polyimide (0.0127 mm thick each), two layers of adhesive (0.0127 mm thick each), and one layer of ½ oz. copper (0.01775 mm thick), which may be purchased from Nitto Denko.

Figure 7A:
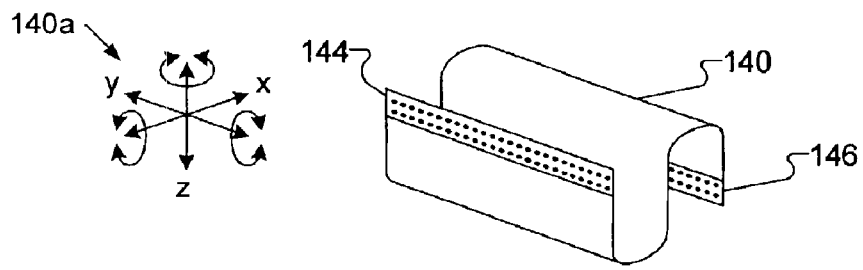
FIG. 7A shows a perspective view of the flex circuit and illustrates the degrees of freedom provided by the "N" shape configuration.
Figure 7B:
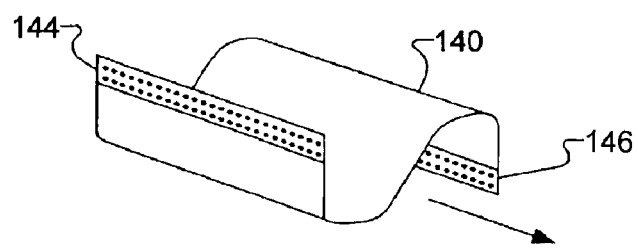
FIGS. 7B, 7C, and 7D show the flex circuit with the ends of the flex circuit shifted relative to each other along the y axis, z axis and rotated along the x axis, respectively.
Figure 7C:
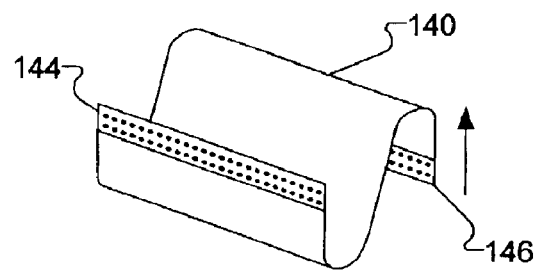
Figure 7D:
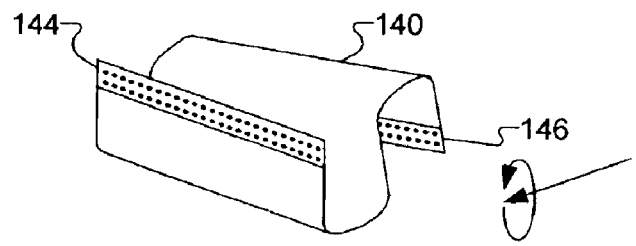

While prior art configurations, such as using slits within the flex circuit, provide flexibility in two dimensions, the "N" shape configuration of flex circuit 140 provides 6 degrees of freedom. FIG. 7A shows a perspective view of flex circuit 140 and illustrates the degrees of freedom provided by the "N" shape configuration with arrows 140a. As illustrated in FIG. 7A, flex circuit 140 permits motion along the x, y, or z axes, as well as rotation along those axes. As can be seen in FIG. 7A, as well as FIG. 6C, the flex circuit 140 includes connector portions 144 and 146, which are soldered or otherwise permanently affixed to the printed circuit board 150 and disk drive 102, respectively. By way of example, FIGS. 7B, 7C, and 7D show flex circuit 140 with the connector portion 146 shifted relative to connector portion 144 along the y axis, z axis and rotated along the x axis, respectively. Accordingly, flex circuit 140 provides a secure yet flexible connection between the disk drive 102 and the printed circuit board 150.

Figures 8A, 8B:
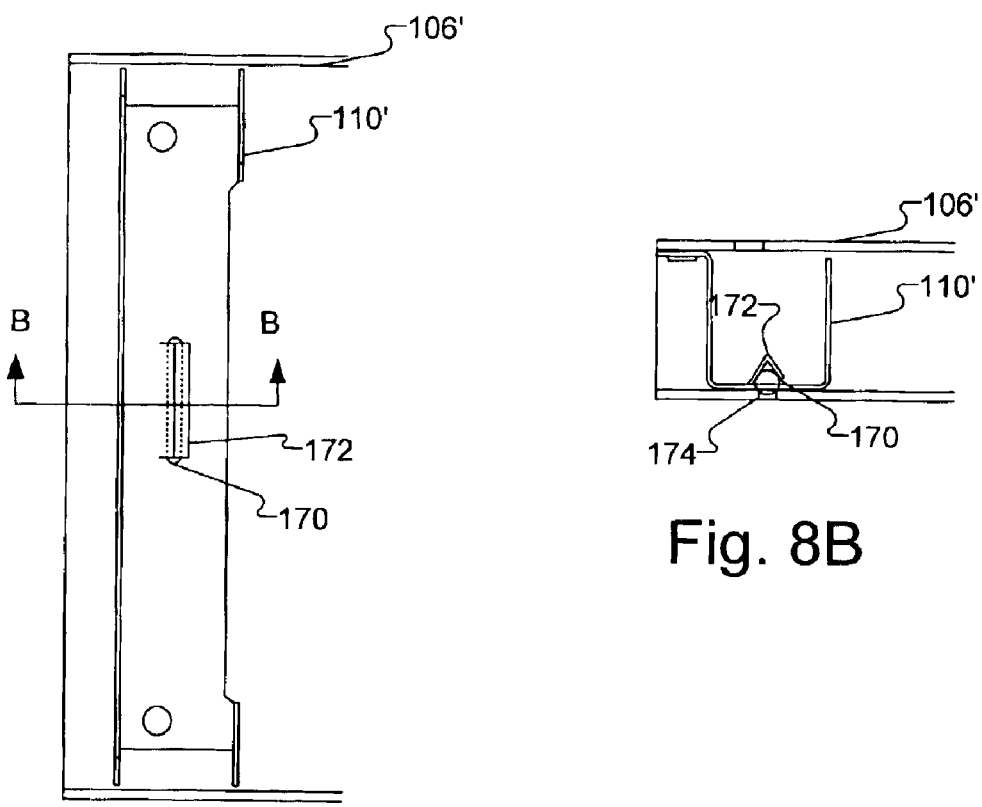
FIG. 8A shows a top view of a portion of a base and connector bracket in which a shock monitor is used.
FIG. 8B shows a side view taken along lines B—B from FIG. 8A.

In one embodiment of the present invention, a shock monitor is employed to indicate if the data storage device 100 has suffered an impact greater than a predetermined force, e.g., 5,000 Gs. FIG. 8A shows a top view of a portion of base 106' and connector bracket 110' in which a shock monitor 170 is used and FIG. 8B shows a side view taken along lines B—B from FIG. 8A. As can be seen in FIGS. 8A and 8B, a section 172 of the connector bracket 110' is bent as a holder for the shock monitor 170. A small hole 174 in the base 106' permits the shock monitor 170 to be viewed.

The shock monitor 170 may be, e.g., a Shockwatch Clip manufactured by Shockwatch, located in Dallas Tex. Of course, the location of the shock monitor 170 shown in FIGS. 8A and 8B is exemplary.

Figure 9:
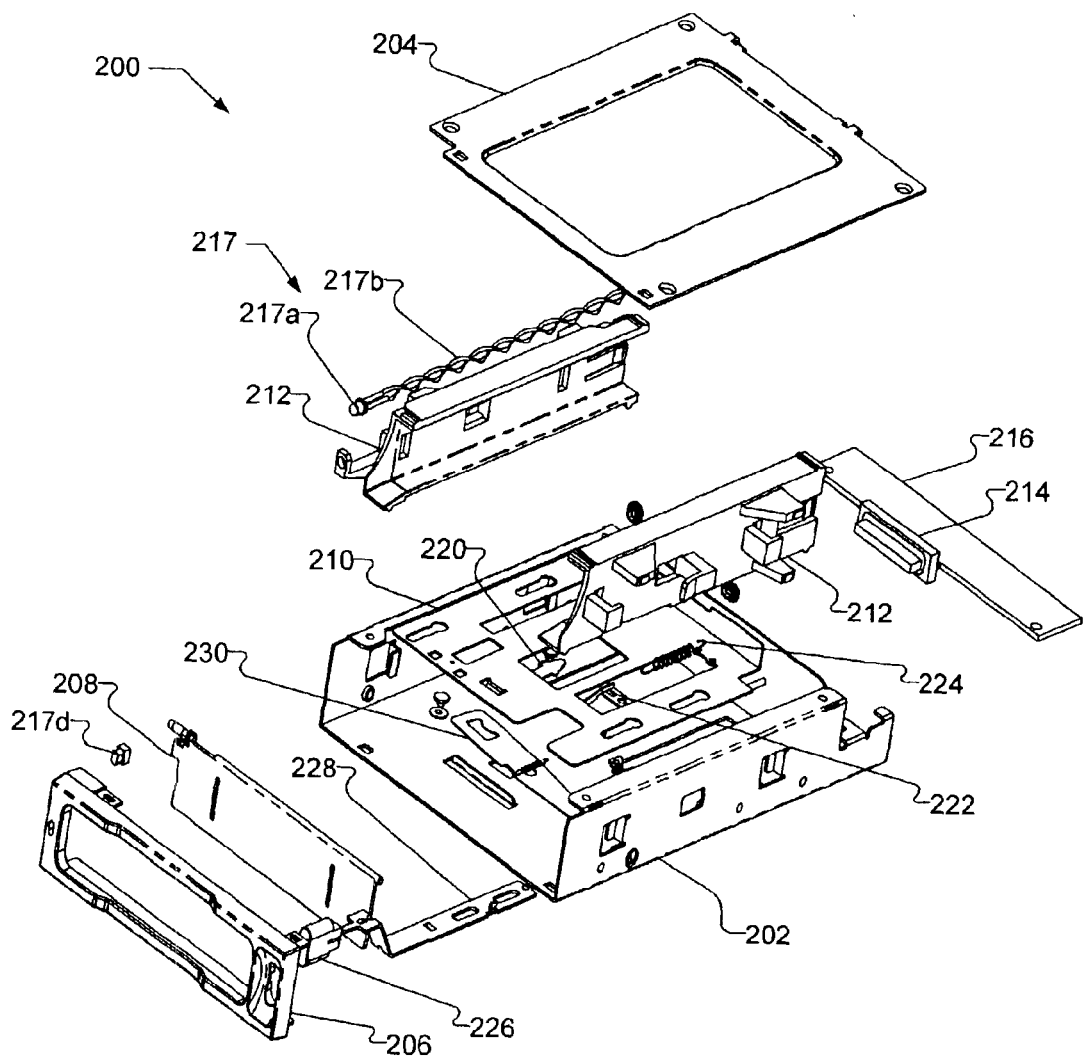
FIG. 9 shows an exploded perspective view of an embodiment of a docking module that may be used with data storage device.

As discussed above, the data storage device 100 may be connected to the host system, such as processors, personal computers, workstations, gaming consoles, televisions including Web TV's, digital cameras and other devices, via different connection systems. For example, cable connectors, such as parallel port, PC Card, Universal Serial Bus, and Firewire, may be used. In addition, a docking module may be used. FIG. 9 shows an exploded perspective view of an embodiment of a docking module 200 that may be used with data storage device 100. FIGS. 10A, 10B, 10C, and 10D shows top plan, side, front and back views of the docking module 200.

In one embodiment, docking module 200 has standard Floppy Disk Drive dimensions, e.g., a length 200 L of approximately 6 inches, a width 200 W of approximately 4 inches, and a height of 1 inch, as shown in FIGS. 10A and 10B. Thus, the docking module 200 may be assembled into the host system in a standard Floppy Disk Drive slot, or any convergence technology products, such as Digital Video Recorder (DVR) Digital Stereo, Play Console, Automobile, Security Devices or other appropriate systems.

The docking module 200 includes a chassis 202 and cover 204. The front of docking module 200 includes a bezel 206 and a spring actuated door 208, through which the data storage device 100 is inserted. A sleigh 210 receives the data storage device 100 and slides along left and right rails 212 until the connector 152 of the data storage device 100 is connected to the connector 214 in the docking module 200. The connector 214 is electrically coupled to a printed circuit board 216, which connects to the host system via a conventional AT/IDE 40 pin connector 215 and four pin power connector 216a. In addition, guide pins 218 (shown in FIG. 10A) engage the alignment holes 160 in the data storage device 100 to assure alignment between the data storage device 100 and the docking module 200. A LED assembly 217, including a LED 217a and cable 217b extends from the printed circuit board 216. A connector 217c for the LED 217a plugs into the printed circuit board 216 and a lens 217D is located in the bezel 206. The LED assembly 217 may be used to indicate when a data storage device is installed and functioning within the docking module 200.

A tab 220 on the sleigh 210 engages with a click spring 222, which is coupled to the chassis 202, to securely hold the data storage device 100 engaged with the connector 214. A spring 224 between the sleigh 210 and the chassis 202 biases the sleigh 210 towards the front of the data storage device 200, but when engaged, the click spring 222 and tab 220 mechanism overcomes the spring bias. For the removal of data storage device 100 from docking module 200, an actuating mechanism, such as button 226, is used. The button 226 is connected to a pusher rod 228 that rotates a lever 230 to pull tab 220 out of the click spring 222. The lever 230, for example, rotates about a fulcrum coupled to the chassis while the end of the lever is engaged with the sleigh 210. Once the tab 220 is pulled out of click spring 222, the spring 224 moves sleigh 210 with data storage device 100 toward the front of the docking module 200.

In one embodiment, low force connectors are used as interface connectors 152 and 214 of the data storage device 100 and docking module 200. For example, 36 pin centronics connectors may be used to connect the data storage device 100 and docking module 200. A typical mating connector has a locking force of five to six pounds, which provides a life of approximately 500 cycles. With the use of a low mating force connector, e.g., the connector has a locking force of one to two pounds; the mating life cycle may be increased from the conventional 500 cycles to approximately 10,000 cycles. An increased life cycle is important for a portable data storage device. In addition, the low mating force produces a smoother insertion/removal feel for the end user. By way of example, a suitable 36 pin connector 152 for the data storage device 100 may be purchased from AMP as model Champ 0.050 Series II connector part number 2-175677-5. The connector 214 on the docking module may be purchased from Circuit Assembly Corporation as part number 627059.

The AT/IDE connector 142 of the disk drive 102 is a 44 pin connector. Because data storage device 100 uses a 36 pin connector 152, the signals from the AT/IDE 44 pin connector must be converted. This conversion may be performed, e.g., on the printed circuit board 150 in the data storage device.

Figure 11:
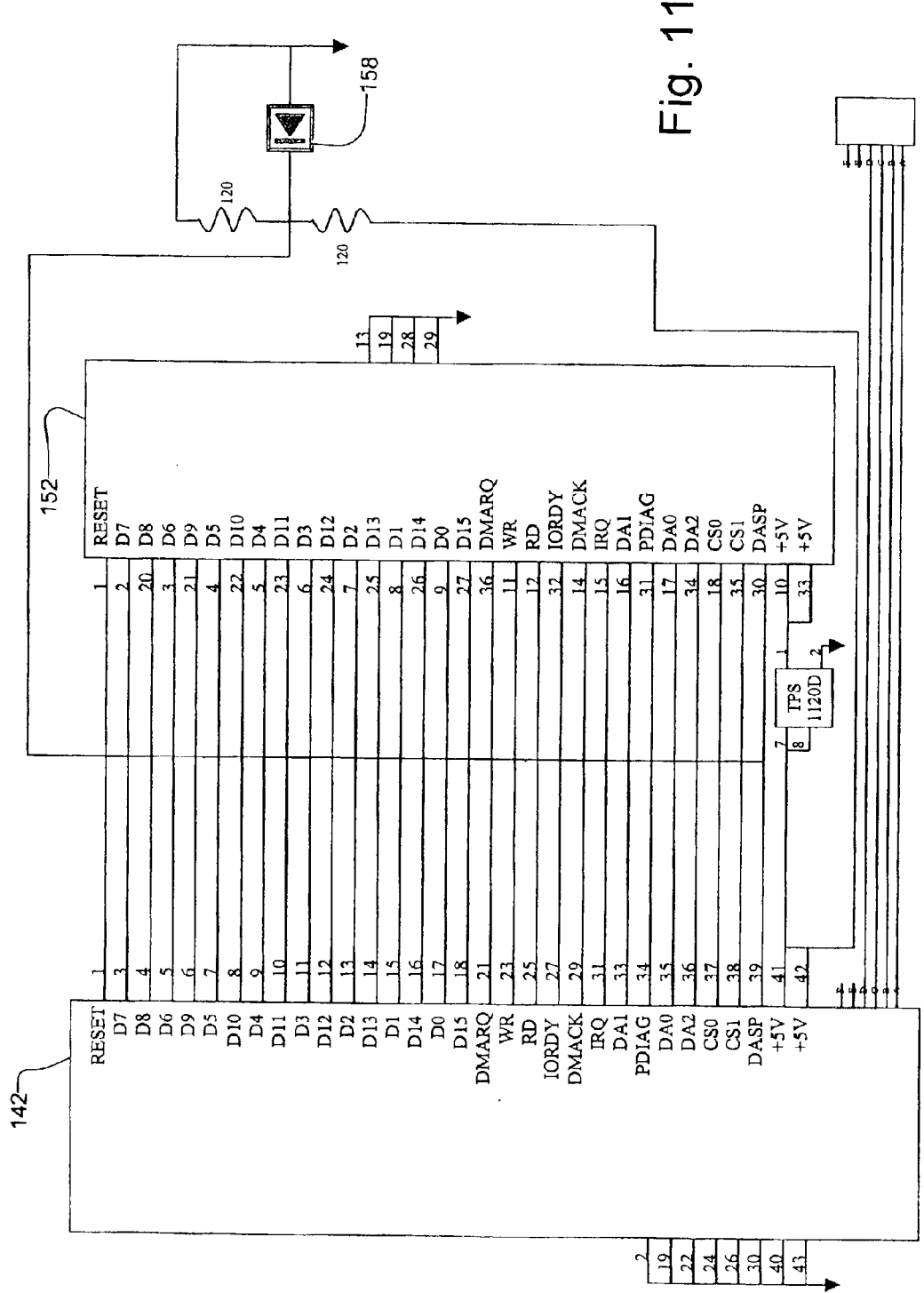
FIG. 11 is a schematic diagram showing the connections between the AT/IDE connector from the disk drive, which has 44 pins, to the connector, which has 36 pins.

FIG. 11 is a schematic diagram showing the connections between the AT/IDE connector 142 from the disk drive, which has 44 pin connections, to the connector 152, which has 36 pins. FIG. 12 is a table showing the pin numbers of the 44 pin AT/IDE connector 142 of the disk drive 102 and the 36 pin mating connector 152 and the signals that are carried on each pin. As can be seen, the AT/IDE connector 142 carries ground on eight pins (i.e., pins 2, 19, 22, 24, 26, 30, 40, and 43), while the connector 152 carries ground on only four pins (i.e., 13, 19, 28, and 29). In addition, the AT/IDE connector 142 reserves pin 44 and uses pin 20 as the KEY LOCK, and pins 28 and 32 are for the CSEL and IOCS16 signals, respectively. The connector 152 does not carry CSEL or IOCS1 signals and does not use pin connections as the KEY LOCK or as a reserve. Accordingly, the connector 152 uses eight less pins than is used by the AT/IDE connector 142.

In one embodiment, the alignment pins 218 are used as ground contacts. Thus, two additional ground contacts are provided without requiring the use of additional pins connector 152. The use of additional grounding contacts is particularly useful for data signal integrity at high data transfer rates, e.g., 100 MB/sec and above.

Figure 13:
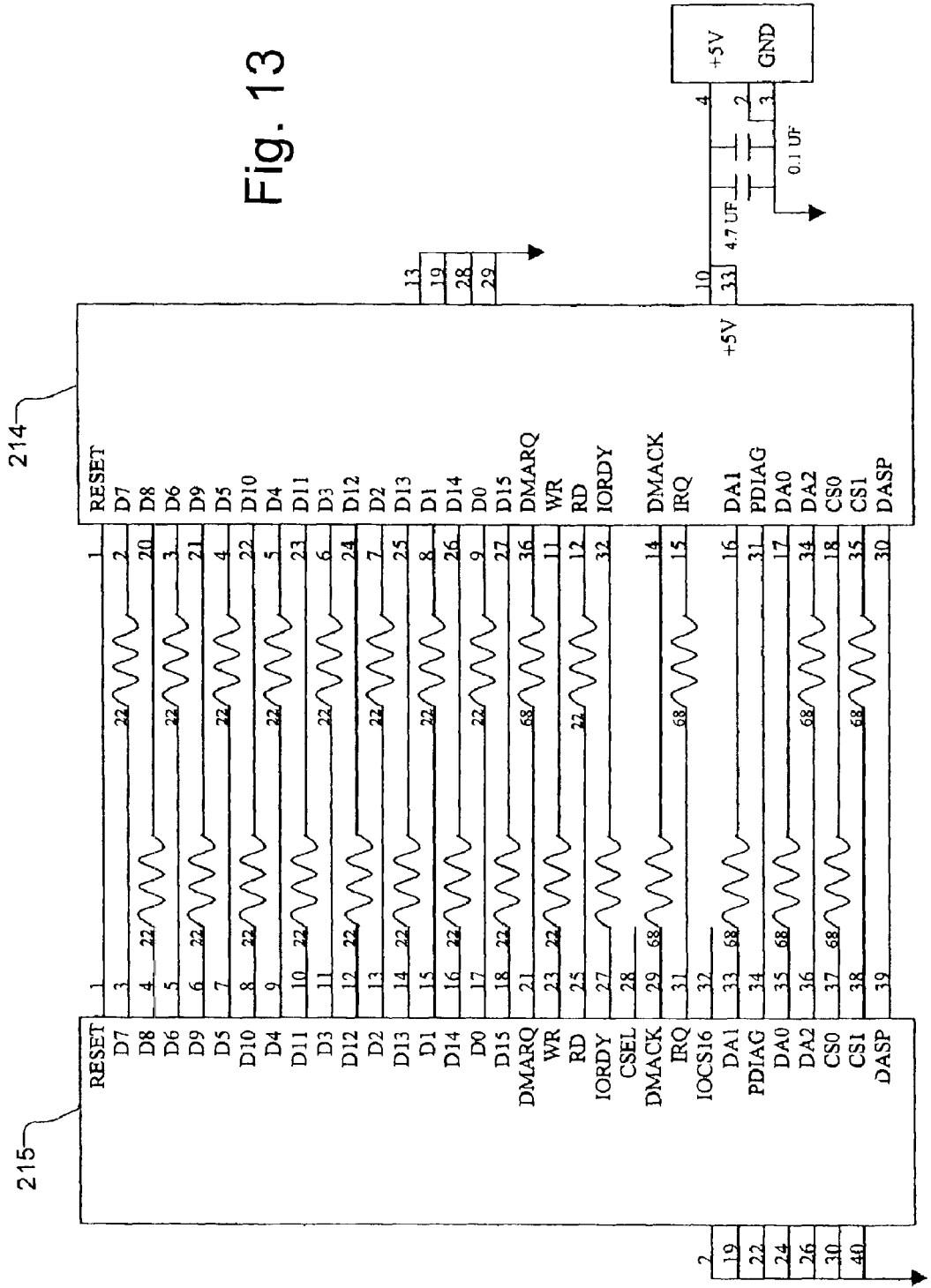
FIG. 13 is a schematic diagram showing the connections between the connector on the docking module, which has 36 pins, and the host interface, which is an AT/IDE 40 pin connector.

FIG. 13 is a schematic diagram showing the connections between the connector 214 on the docking module 200, which has 36 pin connections that connect with the connector 152 of the data storage device 100, and the host interface, which is an AT/IDE 40 pin connector 215. FIG. 14 is a table showing the pin numbers of the 40 pin AT/IDE connector 215 of the host interface and the 36 pin mating connector 214 and the signals that are carried on each pin. As discussed above, the pins 20, 28, and 32, which are used for the KEY LOCK and CSEL and IOCS1 signals on the host interface AT/IDE-40 connector 215, are not connected to pins on the connector 214 for the docking module 200. In addition, the AT/IDE-40 connector 215 of the host interface carries ground on seven pins (2, 19, 22, 24, 26, 30, and 40), while the connector 214 carries ground on only four pins (13, 19, 28, and 29). The connector 214, however, carries power on pins 10 and 33, which is not carried on the AT/IDE-40 connector 215 of the host interface, but is carried by power connector 216a, shown in FIG. 10A. Accordingly, a transition from 36 pins at the docking module 200 to 40 pins at the host interface can be made.

By reducing the number of pins from 44 at the disk drive 102 to 36 at the connectors 152 and 214, the amount of force required to mate the connectors is reduced. With a lower mating force, the life cycle is increased. Moreover, with the use of 36 pins, the data storage device 100 may be used with alternative connection systems. For example, interface cable connectors, such as PCMCIA, Universal Serial Bus, Firewire, and CardBus, may be used to connect the data storage device 100 to the host system, where the host supports such connections. In some interface cable connectors, e.g., PCMCIA, the power may be provided through the cable, while with other connector systems, e.g., Universal Serial Bus, SCSI port, optical fiber, an external power supply is required.

In another embodiment, the connectors 152 and 214 may use a standard 50 pin connector rather than a 36 pin connector. Of course, if desired pin connectors with more or fewer pins may be used.

In one embodiment of the present invention, security features may be integrated into the data storage device 100 and/or docking module 200. For example, as shown in FIGS. 10A, 10B, and 10D, a memory chip 250, such as a Flash memory, EEPROM, or other appropriate non-volatile memory, may be located on printed circuit board 216. The memory chip 250 stores an encrypted security code. The disk drive 102 in the data storage device 100 also stores an encrypted security code. When data storage device 100 is installed into docking module 200, at start up, a security check is performed, matching the code stored in the disk drive 102 with the code stored in the memory chip 250. If the security codes match, the start up process for the disk drive continues. If, however, the security codes do not match, the start up process is terminated. In additionally, the disk drive 102 may include embedded software that permits password and automatic data encryption. The password and data encryption, for example, is software that allows the end user the ability to assign a password to the disk drive 102. Only with this password can the data be accessed. In addition to the password protection, the end user can have the ability to encrypt the data in case the password protection is compromised. Without the correct encryption key (encryption code) the data cannot be unscrambled to be accessed or viewed.

Although the invention has been described with reference to particular embodiments, the description is only an example of the invention's application and should not be taken as a limitation. Various other adaptations and combinations of features of the embodiments disclosed are within the scope of the invention as defined by the following claims.

What is claimed is:

1. An apparatus comprising:

a housing;

a data storage device mounted inside said housing; and a plurality of pads, each pad mounted approximately at a corner of said data storage device and is disposed between said data storage device and said housing; wherein said pads have side portions that are disposed between the side of said data storage device and the side of said housing and a top portion, the top portion of a plurality of pads is disposed between the top of said data storage device and the top of said housing and the top portion of a plurality of pads is disposed between the bottom of said data storage device and the bottom of said housing;

a mounting bracket inside said housing, said mounting bracket defines a main chamber in said housing, said data storage device being mounted in said main chamber; and at least two pads are disposed between said data storage device and said mounting bracket.

2. An apparatus comprising:

a housing;

a data storage device mounted inside said housing; and a plurality of pads, each pad mounted approximately at a corner of said data storage device and is disposed between said data storage device and said housing; wherein each pad has a side portion and top portion in an "L" shaped configuration, the side portions are disposed between the side of said data storage device and the side of said housing and the top portion of a plurality of pads is disposed between the top of said data storage device and the top of said housing and the top portion of a plurality of pads is disposed between the bottom of said data storage device and the bottom of said housing.

3. The apparatus of claim 2, wherein said pads are comprised of a polyurethane material.

4. The apparatus of claim 3, wherein said pads are comprised of a polyether-based polyurethane material.

5. The apparatus of claim 3, wherein said pads are comprise of a thermoset polyurethane material.

6. An apparatus comprising:

a housing;

a data storage device mounted inside said housing; and a plurality of pads, each pad mounted approximately at a corner of said data storage device and is disposed between said data storage device and said housing; wherein said pads have side portions that are disposed between the side of said data storage device and the side of said housing and a top portion, the top portion of a plurality of pads is disposed between the top of said data storage device and the top of said housing and the top portion of a plurality of pads is disposed between the bottom of said data storage device and the bottom of said housing, wherein said top portion of said pads has a conical shape.

7. The apparatus of claim 6, wherein the conical shaped top portion is hollow.

8. The apparatus of claim 1, wherein there are eight pads.

9. The apparatus of claim 1, wherein there are four pads.

10. The apparatus of claim 2, wherein said housing is comprises of a metal material.

11. The apparatus of claim 2, further comprising a means for determining if said apparatus has received an impact over a predetermined force.

12. The apparatus of claim 2, further comprising:

a connector disposed at the front of said housing;

a flex circuit having a flexible substrate with a first connector at a first end and a second connector at a second end, said first connector is coupled to said data storage device and said second connector is coupled to said connector disposed at the front of said housing, said flex circuit is bent such that at least a portion of said flexible substrate is disposed between said data storage device and said connector.

13. The apparatus of claim 2, wherein said data storage device is a disk drive.

14. An apparatus comprising:

a housing;

a data storage device mounted inside said housing;

a connector disposed at the front of said housing; and a flex circuit having a flexible substrate with a first connector at a first end and a second connector at a second end, said first connector is coupled to said data storage device and said second connector is coupled to said connector disposed at the front of said housing, said flex circuit is bent such that at least a portion of said flexible substrate is disposed between said data storage device and said connector;

wherein said flex circuit is bent to form an "N" shape between said data storage device and said connector.

15. An apparatus comprising:

a housing;

a data storage device mounted inside said housing;

a connector disposed at the front of said housing; and a flex circuit having a flexible substrate with a first connector at a first end and a second connector at a second end, said first connector is coupled to said data storage device and said second connector is coupled to said connector disposed at the front of said housing, said flex circuit is bent such that at least a portion said flexible substrate is disposed between said data storage device and said connector;

wherein said flex circuit is bent to form an "M" shape between said data storage device and said connector.

* * * * *